Figure 2:
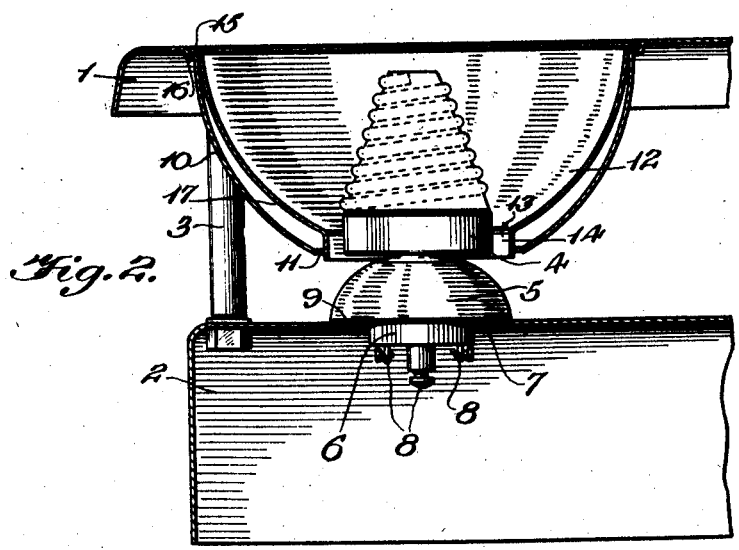

Dec. 22, 1931.  W. NOBLE  1,837,829

STOVE BURNER

Filed May 16, 1929

Inventor
Warren Noble.

By Stanley Lightfoot
Attorney

Patented Dec. 22, 1931

1,837,829

UNITED STATES PATENT OFFICE

WARREN NOBLE, OF DETROIT, MICHIGAN

STOVE BURNER

Application filed May 16, 1929. Serial No. 363,594.

This invention relates to electric cooking tables or ranges and especially the burners thereof with more particular reference to a reflecting type of burner having features of coordination between the burner, reflector and a supporting structure especially lending themselves to the requirements called for and the general practice of cooking over electric burners as upon the cooking table of an electric range.

The object of the said invention is to meet many conditions of efficiency, time saving, convenience, durability, and so forth, at present in many respects seriously lacking in electric cooking appliances on the market, and by so promoting the general usefulness and convenience of such electric cooking devices thereby render them more desirable and more readily available to those who cannot afford the expense and time ordinarily entailed in the possession and use of electric ranges.

The marked slowness of electric ranges, especially in bringing a cold burner up to cooking heat, is a matter of common knowledge and seriously retards the more general use of electricity for cooking, and the present invention overcomes this disadvantage to a very marked degree.

It is also an object of the present invention to provide the heat conservation in and about the burner of a cooking table whereby high degree of efficiency from a cooking standpoint will be obtained with a minimum heat loss to the range itself or to the atmosphere, and further to provide a minimum heat loss or absorption in the burner itself and intermediately associated parts, so that any supply to the burner would become available as heat for a cooking to the minimum loss of time after the burner is turned on.

It is an object of the present invention to provide an efficient and reliable reflector which may be used for extended periods without warping or losing its desirable qualities. In order to insure such qualities, it is the object of this invention to provide a reflector having a refractory metallic lining for exposition to the heat of a burner, such a lining to have the additional qualities of resisting staining or corrrosion which might impair its reflective qualities.

It is a further object to provide a reflector and burner coordination in which highly effective use of the heat generated in the burner is obtained by means of a reflector having a most advantageous angle of reflection to heat impinging thereagainst and the surface of the burner having a most advantageous angle or radiation to said reflector and also to the bottom of a cooking utensil located thereabove.

It is also proposed to provide means for reducing to a minimum the radiation and convection of heat from the outer surface of the reflector by the provision of air insulation therearound.

Still further the invention contemplates the limiting of the radiation of heat from the reflector to the surrounding parts of the cooking table by the provision of a heat dam at the junction of said reflector and said cooking table.

It is a further object to provide in the reflector an annular drainage opening about said burner and, still further, to provide about the annular opening baffle means tending to restrict cold air turbulence at said opening which might otherwise cool the parts of the burner within the reflector adjacent said opening.

It is also proposed to provide an arrangement of cooking table and distribution cabinet spaced therebeneath with the burner mounted on the cabinet and the reflector on the table and enshrouding the burner in a manner affording ready accessibility for cleaning and replacing the parts, a light and sanitary structure, a structure wherein a minimum of heat is transmitted to the distribution cabinet or the wiring of the burner, and wherein the effects of expansion and contraction of the parts is freely provided for without distortion or injury.

It is also an object to provide for free drainage from burner and reflector together with adequate protection of wiring, burner terminals, switches, and so forth, against access of such drainage thereto.

Still further objects or advantages subsidiary or incidental to the aforesaid objects, or resulting from the construction or operation of the invention as it may be carried into effect, will become apparent as the said invention is hereinafter further disclosed.

In carrying the said invention into effect, I may provide in a range, a cooking table proper, a distribution cabinet for the wiring, switches, and so forth, situated beneath said cooking table and materially spaced therefrom, the cabinet having openings in its top in which electric sockets are mounted and the said table proper having large circular openings above said socket openings, these large openings being provided with depending bowls within which further bowls comprising reflectors are situated with the walls of the inner and outer bowls spaced to provide air insulation therebetween, and electric burners detachably mounted in the sockets and enshrouded by the pairs of bowls, the burners being conical and tapering towards their upper ends whereby substantial surface is presented for direct heat radiation to cooking utensils located above the bowls, direct heat radiation to the inner surface of the reflectors also being obtained and the reflectors being characterized by the provision of annular drainage openings around the burners. The sockets have flanges forming a protection against the access of drainage from the reflectors to the interior of the distribution cabinet.

Figure 1:
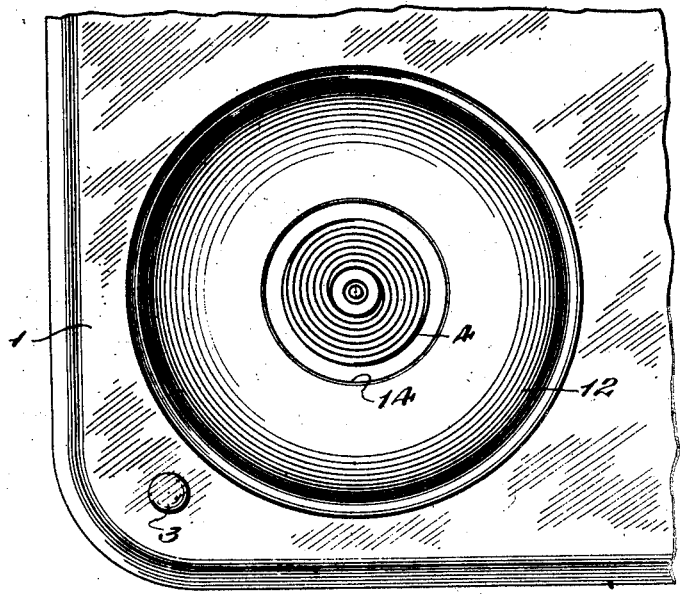

All of which is more particularly described and ascertained hereinafter, by way of example, having reference to the accompanying drawings, wherein:

Figure 1 is a fragmentary plan of a cooking table embodying the said invention; and Figure 2 is a vertical section of the same taken through the center line of one of the burners, with the burner and its socket shown in elevation.

Similar characters of reference indicate similar parts in both figures of the drawings.

1 indicates a cooking table proper of a range, which table is shown in this case as being simply in the form of a plate having downwardly turned margins for the sake of rigidity and appearance, as distinguished from the general form of cooking table top in electric ranges as commonly known, wherein it simply forms the upper plate of a cabinet in which the burners are recessed and the wiring and terminals located. I prefer to provide a separate distribution cabinet 2 for such wiring, burner terminals, switches, and so forth, and to substantially space this below the table proper 1 as by means of spacer members 3.

For the sake of simplicity in the drawings, I have only shown sufficient of the cooking table to illustrate one burner, as it will be obvious that the number of burners may be multiplied to any desired extent, and this burner 4, which may be of the type described in my copending application Serial No. 346,910, filed May 21, 1929, is shown as mounted in a socket 5 having a reduced portion 6 which extends downwardly through an opening 7 at the top of the distribution cabinet and carries the burner terminals 8. The said socket is provided with a wide flange portion 9 extending about the margins of the said opening 7 for protective purposes which will be fully apparent when the said invention is more completely disclosed hereinafter.

Cooking table 1 has mounted therein, and preferably integral therewith, a bowl 10 enshrouding the said burner 4 and extending downwardly and upwardly towards the base of the said burner, said bowl having an opening 11 at its base materially larger than the diameter of the burner at that point to permit the passage of the lower part of the burner therethrough as shown; and within this bowl is a reflector 12 also enshrouding the said burner and having an opening 13 in its base and a downwardly depending skirt 14 at the margin of said opening, this skirt depending through the opening 11 of the bowl 10.

The upper edge of the said reflector 12 is flanged at 15, this flange resting in a suitable groove 16 provided at the upper edge of the outer bowl 10, so that it will be seen that the said reflector may be readily removed for cleaning without necessitating removal of the burner, and it will further be seen that the break between the metal of the flange of the reflector and the grooved part of the bowl 10 in which said flange rests provides a heat dam resisting flow of heat from the reflector to the surrounding structure.

It will also be seen that the spacing of the bowl 10 from the reflector 12 provides an air insulation 17 resisting loss of heat outwardly of the said reflector by convection and radiation, such as could otherwise take place. The skirt 14 of the reflector also tends to maintain a quiescent state of the air between the bowl 10 and the reflector 12, and still further tends to limit air turbulence in the lower part of the reflector about the burner, such as would otherwise promote cooling of the lower part of the burner.

It should be understood in considering efficiency and full usefulness of electric burners, that the cooking utensil is supposed to cover the entire burner, in this case the entire open face of the reflector 12, and under such circumstances an entirely closed heat chamber about the burner 4 is obtained except for the comparatively smaller drainage opening of the reflector. Under these conditions excessive cold air turbulence within the lower part of the reflector would, of course, detract somewhat from the efficiency of the device.

The reflector 12 being, in this example, of a generally hemispherical form converges towards the base of the burner 4, and the said burner being of conical form converges upwardly in the direction of the center of the open face of the reflector; so that the base of a cooking utensil located over the reflector will be exposed to considerable direct heat radiation from the surface of the burner and the angle of the surface of the burner also admits of considerable heat radiation therefrom to the inner surface of the reflector 12, this heat in turn being directed by said reflector against the base of the said cooking utensil. A burner of this type has proved in actual practice to be very efficient as compared with the ordinary plate type of burner, for instance, wherein a heating coil is simply recessed into the surface of a heavy porcelain disc.

Drainage through the opening 13 from the reflector 12 onto the top of the distribution cabinet 2, such as when liquid is spilt over the burner, is prevented from entering the cabinet through the opening 7 by the provision of the flange 9 on the socket 5, which flange forms a seal about the said opening 7, and this seal may be augmented if so desired by asbestos or any other suitable packing, as will be readily understood.

This invention may be developed within the scope of the following claims without departing from the essential features of the said invention, and it is so desired that the specification and drawings be read as being merely illustrative, and not in a limited sense, except as necessitated by the prior art.

What I claim is:

1. In an electric cooking table, in combination, an electric burner, a bowl having an opening through the base thereof to receive said burner, and a circular reflector within said bowl supported at the upper edge thereof and having an opening therethrough axially alined with the opening through said bowl, said bowl and said reflector by their respective curvatures forming an air gap therebetween as a heat insulating means for said reflector, and a depending skirt around the opening of said reflector extending substantially below the edge of the hole in said bowl and surrounding the lower part of said burner but spaced therefrom to provide a ring-like opening for the drainage of spilt liquids from said reflector.

2. In an electric cooking table, in combination, an electric burner, a bowl having an opening through the base thereof to receive said burner, a reflector freely supported by said bowl and having an opening through the base thereof alined with the opening through said bowl, said burner having a diameter less than the diameter of the openings through which it extends whereby air may circulate between the base of said burner and said reflector whereby said burner, said reflector and said bowl are each free to expand and contract independently of each other under varying temperatures.

3. In an electric cooking table, in combination, an electric burner, a bowl around said element having an opening through the bottom thereof to receive said burner, a reflector within said bowl having an opening in the bottom thereof alined with the opening in said bowl, and a rim on said reflector flared outwardly to rest on said bowl in order to support said reflector freely whereby said reflector may expand without regard to said bowl, and whereby a heat dam is provided between said reflector and said bowl, said burner having a diameter less than the diameter of said openings whereby said reflector may be readily dismounted without displacement of said element.

4. In combination with a cooking table, an electric burner, a bowl integral with said table having an opening therethrough to receive said burner, said cooking table being countersunk at said bowl to form a ledge, a reflector having a rim for contact with said ledge for support by said cooking table at the upper edge of said bowl, said reflector having less depth than the depth of said bowl whereby an air space is formed therebetween, said burner having less diameter than the diameter of the openings through said bowl and said reflector whereby said reflector is free to expand under rising temperature, and a skirt depending from the rim of the opening in said reflector for restricting the flow of air through said air space.

5. In an electric cooking table, in combination, a table proper, a distribution cabinet therebeneath and materially spaced therefrom, an electric socket mounted on the top of said distribution cabinet, a reflector mounted in said table above said socket and having an opening in the base thereof coaxial with said socket, and a burner extending through the opening of said reflector and detachably engaged with said socket.

6. In an electric cooking table, in combination, a table proper, a distribution cabinet therebeneath and materially spaced therefrom, the space between said cabinet and said table being open for free access thereto, an electric burner mounted above said distribution cabinet, and a reflector depending from said table and enshrouding said burner, the lower part of said reflector having a drainage opening around said burner.

7. In an electric cooking table, in combination, a table proper, a distribution cabinet therebeneath and materially spaced therefrom, said cabinet having an opening in the top thereof, an electric socket positioned in said opening, a burner mounted in said socket, a reflector mounted in said table and enshrouding said burner, said reflector having a drainage opening around said burner, and means around the opening of said distribution cabinet to prevent drainage from said reflector entering said cabinet through said opening.

8. In an electric cooking table, in combination, an electric burner including a base and resistance coils thereon, a reflector having an opening in the bottom thereof to receive said burner, and a skirt depending from the edge of said opening extending well below said coils and surrounding but spaced from said base to form a ring-like passageway for receiving drainage of spilt liquids from said reflector.

In testimony whereof I affix my signature.

WARREN NOBLE.